US006657745B1

(12) United States Patent
Sasaki

(10) Patent No.: US 6,657,745 B1
(45) Date of Patent: Dec. 2, 2003

(54) IMAGE RECORDING APPARATUS

(75) Inventor: Yoshiharu Sasaki, Shizuoka (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 09/282,446

(22) Filed: Mar. 31, 1999

(30) Foreign Application Priority Data

Mar. 31, 1998 (JP) .......................................... 10-086653

(51) Int. Cl.[7] .................................................. G11B 7/24

(52) U.S. Cl. ......................................... 358/1.7; 358/1.9

(58) Field of Search .......................... 358/1.7, 1.9, 296, 358/302, 3.32; 349/22, 96

(56) References Cited

U.S. PATENT DOCUMENTS 5,406,546 A * 4/1995 Uchiyama et al. ....... 369/275.4
5,935,701 A * 8/1999 Nishimura ............... 369/13.48
6,038,243 A * 3/2000 Mogi ...................... 346/107.1
6,310,707 B1 * 10/2001 Kawase et al. ............. 359/122

FOREIGN PATENT DOCUMENTS

JP 62231437 A * 10/1987 ............ G11B/7/24
JP 03160636 A * 7/1991 ............ G11B/7/24

* cited by examiner

*Primary Examiner*—Thomas D. Lee
*Assistant Examiner*—Stephen Brinich
(74) *Attorney, Agent, or Firm*—Sughrue Mion, PLLC

(57) ABSTRACT

An image recording apparatus for recording an image on a recording medium, which comprises a transparent substrate having dependence on polarization and a photosensitive layer provided on the substrate, by providing light energy of polarized light transmitted through the substrate into the photosensitive layer, comprises a rotary drum on which the recording medium is mounted, and a laser head emitting laser light as the polarized light, the polarizing direction of the laser light is made coincident with the polarizing direction of the substrate.

16 Claims, 14 Drawing Sheets

FIG.6(b)

| R | n2 | θ β rad | θ β deg |
|---|---|---|---|
| 0.0000 | 1 | 0.785 | 45.00 |
| 0.0023 | 1.1 | 0.833 | 47.73 |
| 0.0083 | 1.2 | 0.876 | 50.19 |
| 0.0170 | 1.3 | 0.915 | 52.43 |
| 0.0278 | 1.4 | 0.951 | 54.46 |
| 0.0400 | 1.5 | 0.983 | 56.31 |
| 0.0533 | 1.6 | 1.012 | 57.99 |
| 0.0672 | 1.7 | 1.039 | 59.53 |
| 0.0816 | 1.8 | 1.064 | 60.95 |
| 0.0963 | 1.9 | 1.086 | 62.24 |
| 0.1111 | 2 | 1.107 | 63.43 |
| 0.1259 | 2.1 | 1.126 | 64.54 |
| 0.1406 | 2.2 | 1.144 | 65.56 |
| 0.1552 | 2.3 | 1.161 | 66.50 |
| 0.1696 | 2.4 | 1.176 | 67.38 |
| 0.1837 | 2.5 | 1.190 | 68.20 |
| 0.1975 | 2.6 | 1.204 | 68.96 |
| 0.2111 | 2.7 | 1.216 | 69.68 |
| 0.2244 | 2.8 | 1.228 | 70.35 |
| 0.2373 | 2.9 | 1.239 | 70.97 |
| 0.2500 | 3 | 1.249 | 71.57 |

IMAGE RECORDING APPARATUS

BACKGROUND OF THE INVENTION

The present invention relates to an image recording apparatus for recording information such as images, characters or the like on a recording medium and more particularly to an image recording apparatus for recording information such as color images characters or the like using toner of K (black), C (cyan), M (magenta) and Y (yellow) colors.

Various kinds of known image recording apparatus are designed to obtain images on image receiving materials by the use of colored material sheets having colored material layers capable of heat transfer by heating the colored material sheets according to imaging patterns so as to transfer the heated or non-heated portions of the colored material layers to image receiving layers. More specifically, a colored material sheet with a hot-melt, thermal adhesive or sublimational colored material layer formed on a substrate is used for forming a latent image on a colored material layer by heating the colored material layer according to an imaging pattern with optical beams such as laser light from the back side of the colored material sheet (what is opposite to the colored material layer) or the back side of an image receiving material at least in a recording position by stacking the colored material sheet and the image receiving material in order to make the colored material layer and the image receiving material sufficiently adhere to each other. Then the exposed portion of the colored material layer is transferred onto the image receiving layer so as to transfer the image onto the image receiving material by peeling the colored material sheet off the image receiving material.

FIG. 8 is a schematic diagram of such a related image recording apparatus as aforesaid. FIG. 8(*a*) shows an example of an outer drum type in which the surface 24*a*, which is coated with a colored material, of a recording medium 24 is arranged on the outer side of a recording drum 23 by putting the coated surface 24*a* face up so that the coated surface is irradiated with laser light emitted from an optical head 21 for heating from the outside; FIG. 8(*b*), an example of an inner drum type in which the coated surface 24*a* of a recording medium 24 is arranged on the inner side of a recording drum 23*b* by putting the coated surface 24*a* face up so that the coated surface 24*a* is irradiated with laser light for heating from the outside; and FIG. 8(*c*), an example of an inner drum type in which the coated surface 24*a* of a recording medium 24 is arranged on the outer side of a transparent recording drum 23*c* by putting the coated surface face down so that the coated surface 24*a* is irradiated with laser light for heating from the inside of the recording drum 23*c*.

These three examples are of such a type that the coated surface is directly irradiated with laser light. In other words, any problem of polarization dependence does not develop in the substrate of the recording medium when image recording of this type is carried out.

In the case of a heat transfer type image recording apparatus as shown in FIG. 9, on the other hand, a recording material 24 prepared by laying a toner layer 24*a* coated on a transparent substrate 24*b* of a toner sheet on top of the image receiving layer of an image receiving sheet is arranged on the outer side of a recording drum 23 by putting the transparent substrate 24*b* of the toner sheet face up and the toner-coated surface 24*a* is irradiated with laser light for heating from and through the substrate 24*b*.

In the example of the related heat transfer type image recording apparatus, a PET (polyethylene terephthalate) base, a TAC (triacetyl cellulose) base and a PEN (polyethylene naphthalate) base for use as the substrate of the toner sheet are made into a film having uniform thickness by the orientation method.

However, moleculars are orientated in one direction because these materials are forced to stretch out at the time of the orientation, thus causing polarizing characteristics. In the case of FIG. 9, the following problems still exist: since the colored material sheet is heated after the laser light is passed through the PET base, the transmissivity and the reflectivity vary when polarized light such as laser light is incident on the polarization-dependent PET base and when the polarizing direction of the laser light differs from that of the PET base and therefore the recording sensitivity is lowered at an angle at which the transmissivity becomes reduced and nonuniformity of images occurs when the transmissivity has an in-plane distribution.

SUMMARY OF THE INVENTION

It is therefore an object of the present invention to provide an image recording apparatus for use in increasing recording sensitivity by adjusting polarizing directions of a substrate of the toner sheet and recording laser light so that the polarizing directions of the substrate of the toner sheet and the recording laser light are brought into coincidence with each other, decreasing light energy to be consumed wastefully in the substrate of the toner sheet by transmitting laser power through the substrate up to a photothermal conversion layer as much as possible so as to convert the light energy into thermal energy, and for making use of energy effectively by decreasing the quantity of light reflected from the substrate of the toner sheet.

In order to achieve the above object, there is provided an image recording apparatus for recording an image on a recording medium, which comprises a transparent substrate having dependence on polarization and a photosensitive layer provided on the substrate, by providing light energy of polarized light transmitted through the substrate into the photosensitive layer, comprising a laser light source emitting laser light as the polarized light, the polarizing direction of the laser light is made coincident with the polarizing direction of the substrate.

Specifically, an angle made by the polarizing direction of the substrate and the polarizing direction of the laser light is ±30 degrees or smaller.

Accordingly, the polarizing directions of the substrate and the laser light are set parallel to each other, which results in increasing the transmissivity and decreasing the quantity of attenuation of the laser light, whereby recording sensitivity is enhanced.

It may be configured that: an optical axis of the incident laser light is tilted with respect to a normal of the substrate.

The tilted angle between the normal of the substrate and the optical axis of the laser light may be proximate to the Brewster's angle of the substrate.

The tilted angle between the normal of the substrate and the optical axis of the laser light may be in the range of 1–65 degrees.

According to the above configurations, the transmissivity can be further improved.

It may be configured that: the recording medium is a photo-heat-sensitive transfer material including a transparent substrate and a photo-heat-sensitive transfer layer.

According to the present invention there is also provided an image recording apparatus for recording an image on a recording medium, which comprises a transparent substrate having dependence on polarization and a photosensitive layer provided on the substrate, by providing light energy of polarized light transmitted through the substrate into the photosensitive layer, comprising: a rotary drum on which the recording medium is mounted; and a laser head emitting laser light as the polarized light, the polarizing direction of the laser light is made coincident with the polarizing direction of the substrate.

Accordingly, the polarizing directions of the substrate and the laser light are set parallel to each other, which results in increasing the transmissivity and decreasing the quantity of attenuation of the laser light, whereby recording sensitivity is enhanced.

It may be configured that: an optical axis of the incident laser light is tilted with respect to a normal of the substrate.

Accordingly, the transmissivity can be further improved.

It may be configured that: the recording medium is a toner sheet roll, in which the polarizing direction of the substrate is coincident with an axial direction thereof, to be disposed into the image recording apparatus, and the polarizing direction of the laser head is oriented to an axial direction of the rotary drum.

Accordingly, lacking in image uniformity can be obviated by making compensating for mainly the lateral polarizing direction of the substrate of the toner sheet in the image recording apparatus.

It may be configured that: the recording medium is a toner sheet roll, in which the polarizing direction of the substrate is coincident with a circumferencial direction thereof, to be disposed into the image recording apparatus, wherein the polarizing direction of the laser head is oriented to a rotational direction of the rotary drum.

Accordingly, lacking in image uniformity can be obviated by making compensating for mainly the vertical polarizing direction of the substrate of the toner sheet in the image recording apparatus.

It may be configured that: the laser head is configured so as to be rotatable around an optical axis of the laser light emitted therefrom.

It may be configured that: the image recording apparatus further comprises a phase plate rotatably provided at one of an emission side and inside of the laser head.

Accordingly, the polarizing direction of the laser light can be simply changed by rotating the laser light head or the phase plate with respect to the optical axis.

It may be configured that: information for indicating the polarizing direction of the substrate is recorded at least one of the recording medium and a package of the recording medium.

Accordingly, troublesome of measuring the polarizing direction of the toner sheet for use each time can be saved and the image recording apparatus becomes user-friendly.

The indicating information is constituted by at least one of a numerical value, a symbol, a bar code, a magnetic recording medium and an IC card.

It may be configured that: the image recording apparatus further comprises: a reading device for reading the indicating information; and a driving device for rotating the laser head around an optical axis of the laser light emitted therefrom so as to make the polarizing direction of the laser light coincident with the polarizing direction read from the indicating information by the reading device.

Alternatively, the image recording apparatus further comprises a driving device for rotating the phase plate so as to make the polarizing direction thereof coincident with the polarizing direction read from the indicating information by the reading device.

Accordingly, the user needs not to do anything in particular regarding the adjustment of the polarizing direction.

It may be configured that: the recording medium is a photo-heat-sensitive transfer material including a transparent substrate and a photo-heat sensitive transfer layer.

DETAILED DESCRIPTION OF THE PREFERRED EMBODIMENTS

Preferred embodiments according to the present invention be described below with reference to the accompanying drawings.

Figure 1:
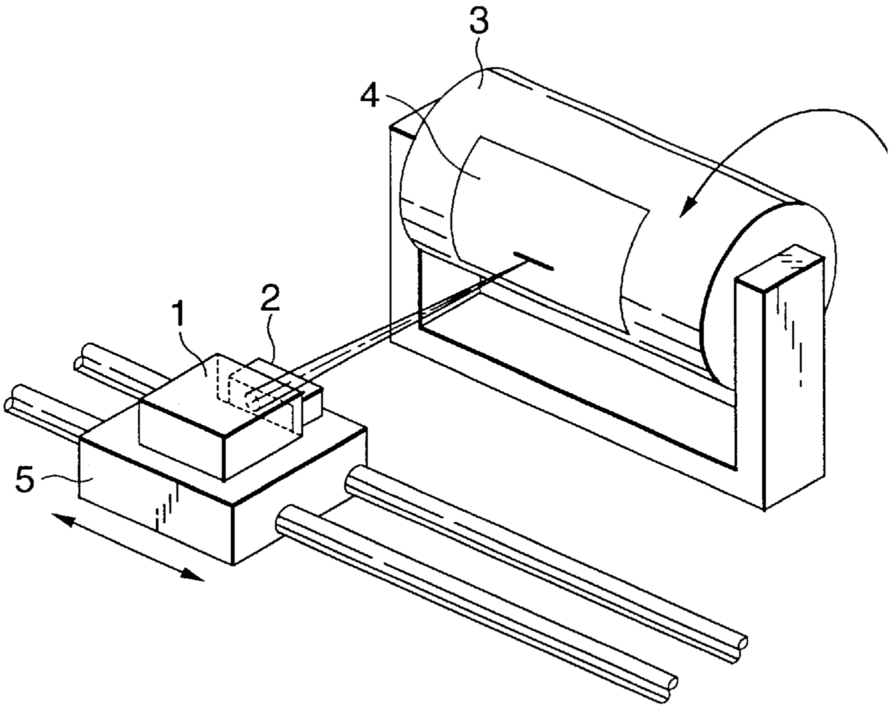
FIG. 1 is a schematic illustration showing one embodiment of an image recording apparatus according to the present invention.
Figure 2:
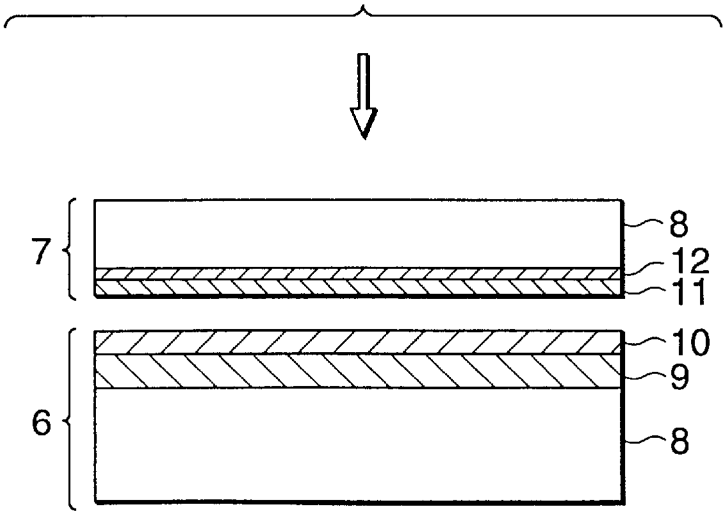
FIG. 2 is a schematic illustration showing structure of the recording material shown in FIG. 1.
Figure 3A:
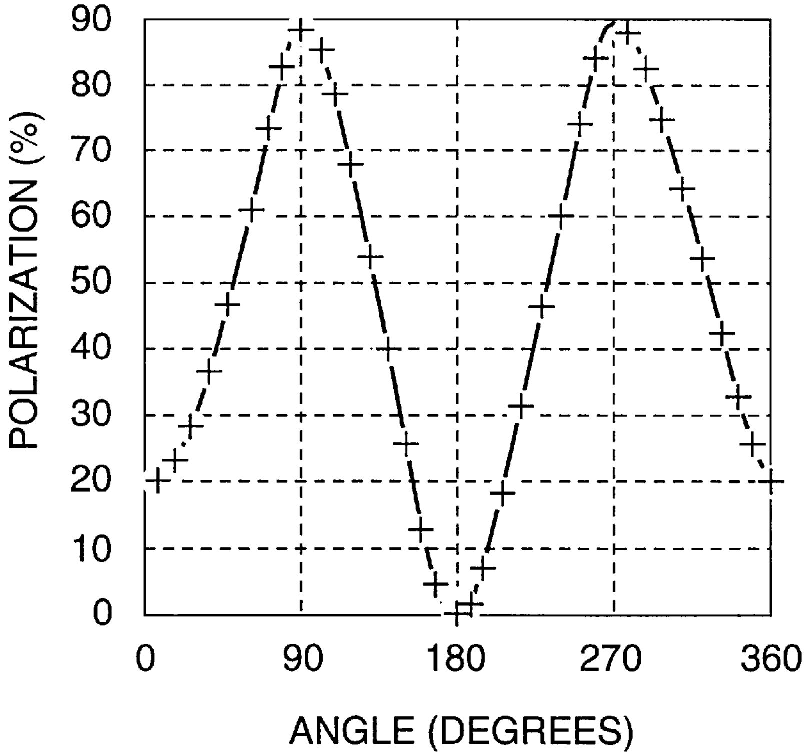
FIGS. 3(*a*) and (*b*) show the polarizing directions of laser beams emitted from the optical head shown in FIG. 1.
Figure 3B:
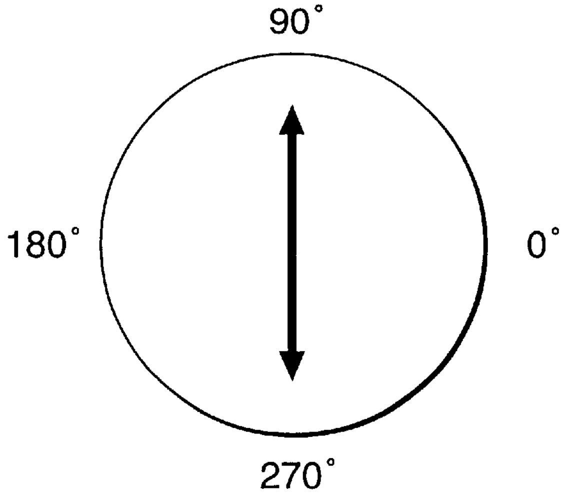
Figure 4A:
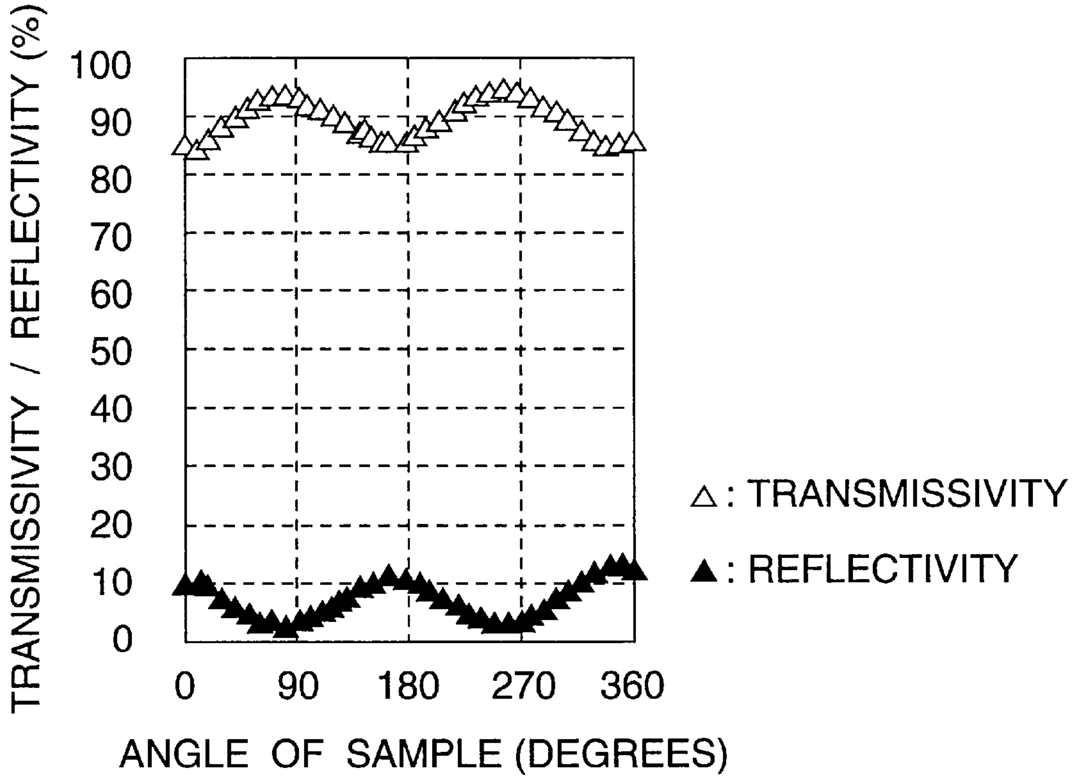
FIGS. 4(*a*) and (*b*) show the polarization dependence of the substrate shown in FIG. 2.
Figure 4B:
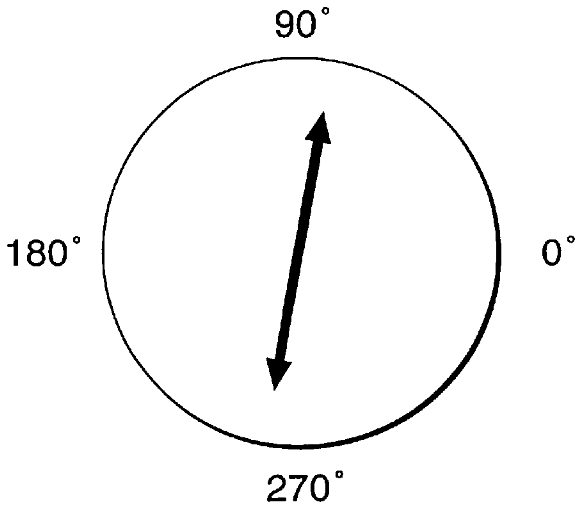
Figure 5:
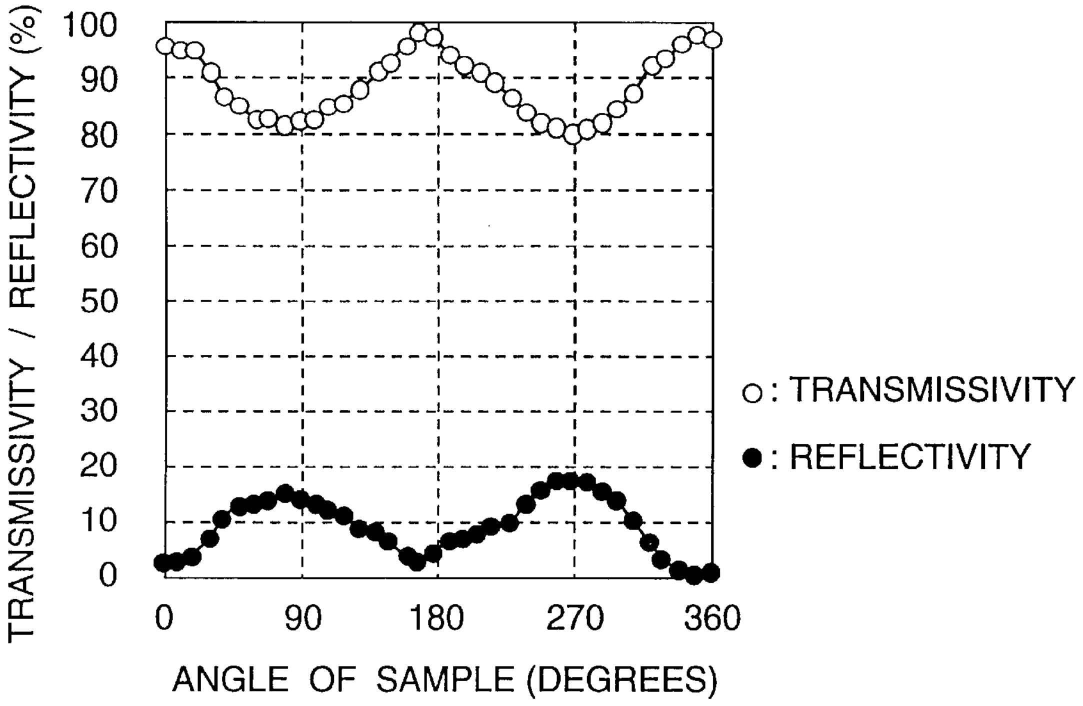
FIG. 5 shows the polarization dependence of the substrate shown in FIG. when the substrate is tilted.
Figure 6A:
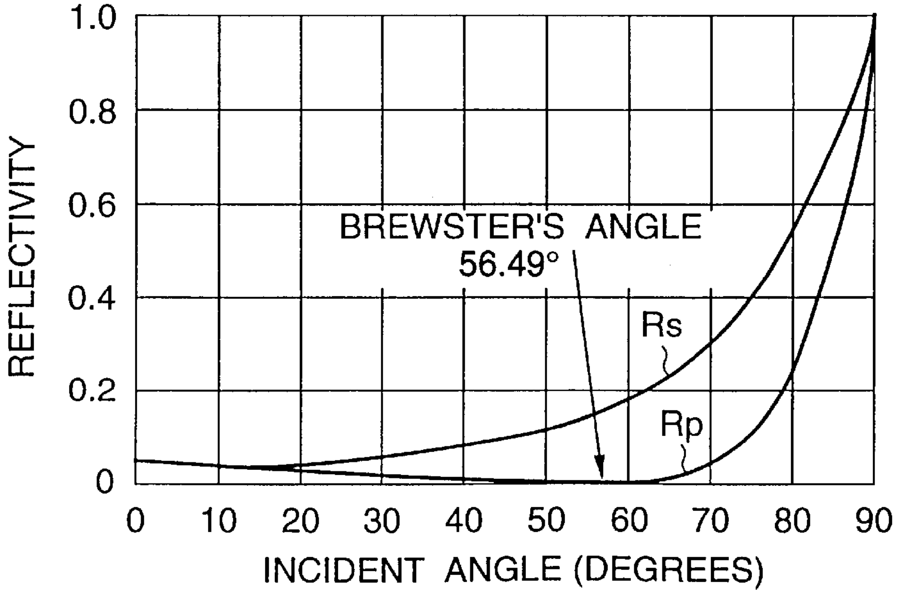
FIGS. 6(*a*) and (*b*) show the Brewster's angle of the substrate shown in FIG. 5.
Figure 7A:
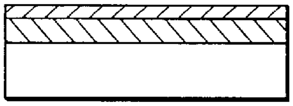
FIGS. 7(*a*) to (*f*) are diagrams showing the recording steps followed in the image recording apparatus of FIG. 1.
Figure 7B:
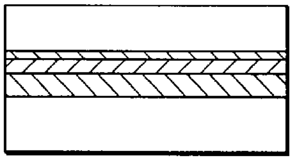
Figure 7C:
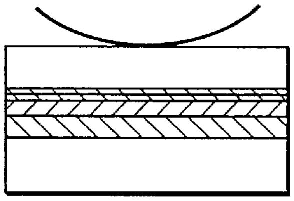
Figure 7D:
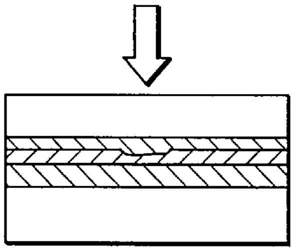
Figure 7E:
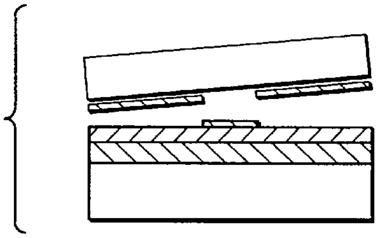
Figure 7F:
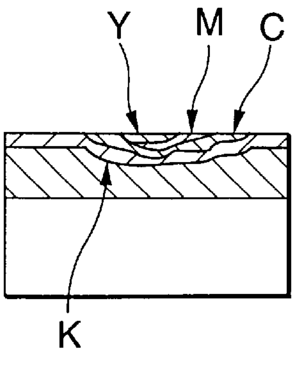
Figure 8A:
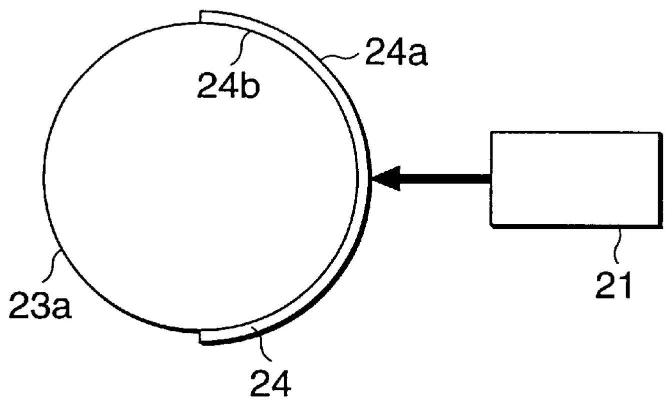
FIGS. 8(*a*) to (*c*) are schematic illustrations showing related image recording apparatuses of such a type as to directly irradiate a coated surface.
Figure 8B:
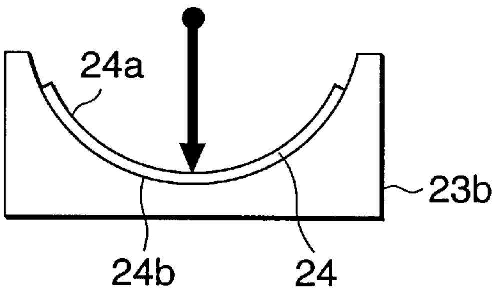
Figure 8C:
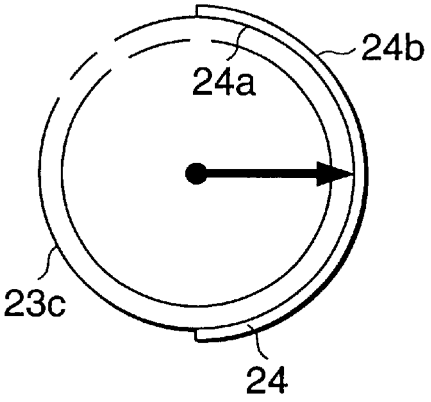
Figure 9:
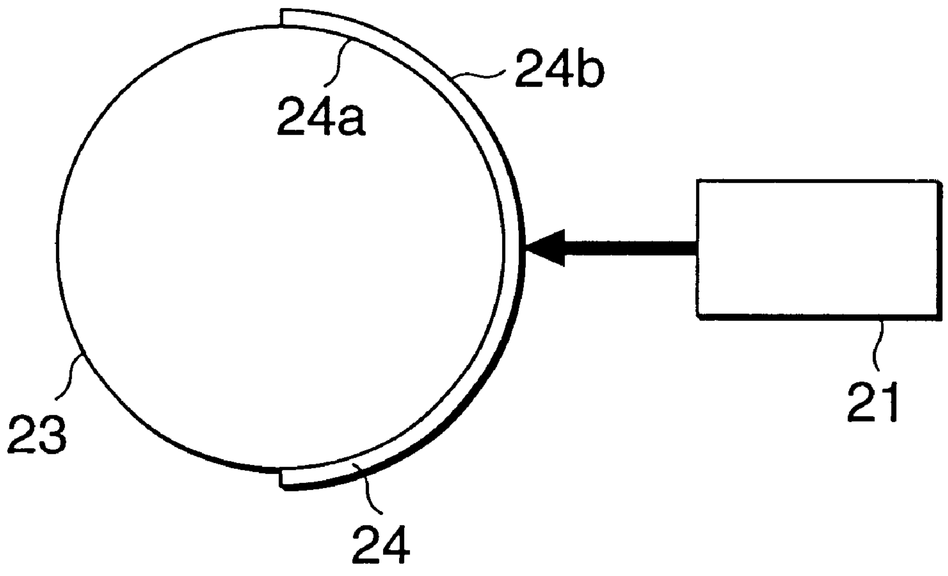
FIG. 9 is a schematic illustration showing a related image recording apparatus of such a type as to irradiate a coated surface through a substrate.

FIG. 1 is a schematic illustration showing one embodiment of an image recording apparatus according to the present invention. FIG. 2 is a schematic illustration showing structure of the recording material shown in FIG. 1. FIGS. 3(*a*) and (*b*) show the polarizing directions of laser beams emitted from the optical head shown in FIG. 1. FIGS. 4(*a*) and (*b*) show the polarization dependence of the substrate shown in FIG. 2. FIG. 5 shows the polarization dependence of the substrate shown in FIG. 2 when the substrate is tilted. FIGS. 6(*a*) and (*b*) show the Brewster's angle of the substrate shown in FIG. 5. FIGS. 7(*a*) to (*f*) are diagrams showing the recording steps followed in the image recording apparatus of FIG. 1.

In FIG. 1, an optical head 1 is of a multi-beam type for irradiating a toner sheet with laser beams by combining a plurality of LDs (semiconductor lasers) or the like. A polarization regulating member 2 is disposed in the optical paths of laser beams of the optical head 1 and used for regulating polarizing directions. More specifically, the polarization regulating member 2 is used for making variable the polarizing direction of a beam by means of an optical element utilizing a multi-refractive characteristics such as a phase plate; in this case, any other optical element may be utilized as long as it has an equal polarization regulating function.

In addition, a means for varying the angle of laser light by mechanically and directly varying the angle of the optical head by means of a motor.

A rotary drum 3 is rotated at high speed (about 2–20 m/s) in the main scanning direction shown by an arrow, a recording material (a transfer sheet) 4 being wound on the rotary drum 3. The recording material 4 is a heat transfer sheet comprising a toner sheet and an image receiving sheet, which material 4 will be more fully discussed hereinafter. Although a color proof type sheet is shown as the recording material 4, there is also another type in which a toner sheet is conveyed via a conveying roller (not shown) to the rotary drum 3 from a magazine (not shown) where the sheet is set in rolls. A moving stage 5 of the optical head 1 is used for scanning the surface of the recording material 4 on the rotary drum 3 rotating at high speed while moving in the sub-scanning direction shown by a double-headed arrow at predetermined timing.

Incidentally, the present invention is also applicable to an image recording apparatus other than the rotary drum type image recording apparatus shown in FIG. 1, the former being designed such that the recording plane of recording paper is scanned two-dimensionally while the recording paper is held between upper and lower conveying rollers and conveyed flatly.

FIG. 2 is a structural drawing of the recording material 4 which comprises an image receiving sheet 6 and a toner sheet 7 to be peeled off. The image receiving sheet 6 comprises a substrate 8 such as a PET base, a TAC base, a PEN base or the like, a cushion layer 9 for absorbing a difference in toner level and an image receiving layer 10 for receiving the toner image peeled off and transferred. The toner sheet 7 comprises a toner layer (a coated surface) 11 containing the KCMY colors of toner (so-called a special color such as gold, silver or gray may be contained), a photothermal conversion (a coated surface) layer 12 for converting laser light energy into heat by means of infrared-absorbing pigment such as carbon, and the substrate 8. In this case, the laser light emitted from the optical head 1 is transmitted through the substrate 8 and used for heating the coated surface.

As recording materials, use can be made of, for example, heat transfer materials described by the present applicant in Unexamined Japanese Patent Publications Nos. 4-295694A, 4-327982A, and 4-327983A.

The operation of the present image recording apparatus be described below.

The LD (semiconductor laser) used for the optical head 1 as a light source is linearly polarized in a parallel direction to a certain PN junction. FIG. 3(*a*) shows a polarizing characteristic curve when the left-hand side in the axial direction of the rotary drum 3 is set at an angle of 0 degrees; and FIG. 3(*b*), a polarizing direction on the optical axis. Angles at which the polarizing characteristic of the light source LD is maximized on the abscissa axis of FIG. 3(*a*) indicate that the light source is polarized in the directions of substantially 90 and 270 degrees (perpendicularity) with respect to the axial direction of the rotary drum 3 as shown in FIG. 3(*b*).

As regards the polarization dependence of the substrate, the substrate 8 of the PET base is stretched by the orientation method to a thickness of about 100 μm and consequently curved wrinkles of a molecular line in the stretched direction are produced, which results in polarization dependence substantially in the vertical direction as shown in FIG. 4(*a*). In FIG. 4(*a*), a black triangle represents reflectivity of the PET base, whereas a white triangle represents transmissivity thereof. As is obvious from FIG. 4(*a*), the transmissivity of the substrate becomes highest (95%) at angles of about 80 and 260 degrees of a sample and the reflectivity thereof becomes lowest (2%) thereat. In other words, the polarization is directed to about 80 and 260 degrees as shown in FIG. 4(*b*).

On the contrary, the transmissivity becomes lowest (87%) at angles of about 170 and 350 degrees of the sample, which results in the worst state in view of heat transfer efficiency.

It thus occurs that image recording apparatus are used in a region where the recording sensitivity is low because no consideration has heretofore been given to the relation between the laser light and a polarizing beam notwithstanding the fact that the substrate 8 of the polarization-dependent PET base is employed.

According to the present invention, a region where the transmissivity is maximized can be selected by taking the polarization relationship into consideration.

A compensation is conducted roughly through the following two stages.

First stage: the polarizing directions of the substrate and the laser light are brought into coincidence with each other.

(a) With reference to FIGS. 4(*a*) and (*b*), for example, as the molecular line of the PET base of the substrate is polarized by −10 degrees in the vertical direction (in this case, rotating clockwise is represented by minus; and rotating counterclockwise is represented by plus), the substrate is rotated by about −10 degrees on the X-Y plane (adjusted manually, mechanically or automatically by a motor).

Alternatively, the maximum transmissivity is obtained by rotating the phase plate to adjust the polarizing direction of the laser light so that the polarizing directions of the laser light and the substrate are brought into coincidence with each other.

Still alternatively, the whole optical head or the LD single body may be rotated.

Supposing that the substrate is rotated by 100 degrees on the X-Y plane in this case, it is tantamount to rotate an angle of the sample from 80 degrees to 180 degrees, that is, to make the polarizing directions of the laser light and the substrate meet at right angles and since the transmissivity becomes lowest, maximum light energy becomes attenuated.

With respect to an error arising from having the polarizing directions brought into coincidence with each other, adjustment is made so that the angle between both the polarizing directions is settled at least within ±30 degrees or smaller, preferably ±20 degrees or smaller and most preferably ±10 degrees or smaller.

Second stage: the normal of the substrate and the optical axis of the laser light are tilted and the polarizing directions of the substrate and the laser light are brought into coincidence with each other.

(a) In other words, test results shown in FIG. 5 were obtained by varying the angles at which the normal of the substrate and the optical axis of the laser light are tilted. In FIG. 5, a black circle represents reflectivity of the substrate; and a white circle represents transmissivity thereof.

As is understood in comparison with FIG. 4(*a*) where the normal of the substrate and the optical axis of the laser light are brought into coincidence with each other, the transmissivity of the substrate is improved (99% at 170 and 350 degrees) by adjustably tilting the normal of the substrate and the optical axis of the laser light. Consequently, referring to FIG. 5 first, the normal of the substrate and the optical axis of the laser light are tilted by 170 degrees (i.e., −10 degrees).

(b) Subsequently, the polarizing directions of the laser light and the substrate are brought into coincidence with each other again likewise.

An optimum point in the case of adjusting (a) of the second stage can be derived from the Brewster's angle as shown in FIGS. 6(*a*) and (*b*). More specifically, FIG. 6(*a*) shows variations of reflectivities of Rp and Rs with respect to an incident angle of glass (BK−7) whose refractive index n=1.51 and Rp represents a case where polarization occurs in parallel to the incident angle (a plane formed with a direction in which incident light is transmitted and a normal of a boundary plane), whereas Rs represents a case where it occurs perpendicularly (senkrecht) to the incident plane. When light is incident on glass from air (refractive index n=1.0), the following is made clear from FIG. 6(*a*).

(1) In the case of perpendicular incidence (incident angle=0 degrees), reflectivity R is approximately 4% and remains invariable in both cases of Rp where a beam is polarized in parallel to the incident plane and Rs where a beam is polarized perpendicularly to the incident plane. The reflectivity R at the perpendicular incident angle is obtained from the following equation:

$$R = \frac{(n1 - n2)}{(n1 + n2)^2}.$$

Therefore, when light incidents from air (n1=1.0) to glass (n2=1.51), $$R = \frac{(-0.51)}{(2.51)^2}.$$

(2) However, the reflectivity Rp of the beam polarized in parallel to the incident plane gradually decreases (i.e., the transmissivity increases) as the incident angle increases from 0 degrees as shown in FIG. 6(*a*) and when the incident angle is 56.49 degrees, the reflectivity is seen to become 0 (i.e., the transmissivity will come to 100% if no loss of light occurs). This angle is called the Brewster's angle.

In FIG. 6(*b*), the leftmost side of a table indicates reflectivity R in the case of perpendicular incidence (incident angle=0 degrees); the next right side, refractive index n2 of medium incident from air; and the further next two right sides, Brewster's angles expressed by radians and angles. For example, the reflectivity of air-to-air (refractive index n2=1.0) perpendicular incidence in the first line is 0 and the Brewster's angle of air is 45.00 degrees. The reflectivity of the perpendicular incidence toward glass having a refractive index n2=1.5 is 0.04 as aforesaid and the Brewster's angle is 56.31 degrees.

Consequently, since a Brewster's angle can be derived if the refractive index of the substrate is known when the substrate is irradiated with laser light having polarizing characteristics in the air, the transmissivity is maximized by tilting the normal of the substrate and the optical axis of the laser light so as to satisfy the Brewster's angle.

In the case of a PET substrate, the Brewster's angle is proximate to 58 degrees because the refractive index n2 is about 1.6. Therefore, the angle between the normal of the substrate and the optical axis of the laser light is preferably made variable in the range of 1–65 degrees in this case.

The accuracy of coincidence of the polarizing directions is set at ±30 degrees or smaller, preferably ±20 degrees or smaller and most preferably ±10 degrees or smaller when the readjustment of (b) is made like the first stage.

Other kinds of adjustment may be adopted to suppress an in-plane distribution of transmissivity to reduce lacking in image uniformity. For example, when a roll-like toner sheet is set in the image recording apparatus, the polarizing direction of the laser head and the axial direction of the recording drum are brought into coincidence with each other and the polarizing direction of the substrate and the axial direction of the roll of the toner sheet are also brought into coincidence with each other. Otherwise, the polarizing direction of the laser head and the rotating direction of the recording drum with each other and the polarizing direction of the substrate and the circumference direction of the roll of the toner sheet are also brought into coincidence with each other.

Recording information about the polarizing direction of the substrate on the toner sheet or a part of the toner sheet package saves the trouble of measuring the polarizing direction of the toner sheet and is convenient because the user is allowed to fix the laser light source and the phase plate manually according to the information without measuring the polarizing direction thereof each time.

Moreover, not only information about the polarizing direction of the substrate in the form of at least one of a numerical value, a symbol, a bar code, magnetic medium and an IC card but also an information reading unit for reading these items of information is provided on the image recording apparatus side together with the provision of a driving unit for rotating the laser light source or the phase plate toward the polarizing direction of the substrate thus read thereby. Hence, it is possible to save the trouble of fixing the laser light source and the phase plate manually according to the information for the purpose of adjusting the polarizing direction on the part of the user since the reader reads the numerical value, the symbol, the bard code, the magnetic recording medium or the IC card and since the driving unit automatically rotates the laser light source and the phase plate in the polarizing direction of the substrate and also to eliminate malfunction.

As such a reading unit, use may be made of OCR for reading numerical values and symbols, a bar code reader for reading bar codes, a magnetic reader for reading magnetic recording medium and an IC card reader.

FIGS. 7(*a*) to (*f*) show recording steps followed by the image recording apparatus shown in FIG. 1. First, the process of transferring black color K is performed after the aforesaid regulation of the polarization is carried out. Subsequent steps are as follows:

(1) The image receiving sheet 6 is wound on the drum 3 as shown in FIG. 7(*a*).

(2) The toner sheet of color K is wound as shown in FIG. 7(*b*).

(3) Laminate is carried out as shown in FIG. 7(*c*) (this step may be omitted).

(4) Recording by an irradiation of highly-efficient laser light (represented by an arrow) according to K data, in which the polarizing direction is adjusted and the transmissivity is increased, is conducted as shown in FIG. 7(*d*).

(5) The toner sheet is transferred and peeled off as shown in FIG. 7(*e*).

(6) Similar transfer processing is carried out with respect to colors C, M and Y in the order of planes likewise to form a color image as shown in FIG. 7(*f*).

The present invention can also be applied to photo-thermo-sensitive transfer material. This topic will be discussed below. The present invention can be applied to the following four types of photo-thermo-sensitive transfer material as A) to D):

A) single-color type;

B) single-color type for multicolor recording with four-wavelength laser light;

C) single-color type for multicolor recording with one-wavelength laser light; and D) multicolor type (multilayer photo-thermo-sensitive transfer material type).

A description will be given in the order of A) to D).

A) Single-color Type

Figure 10:
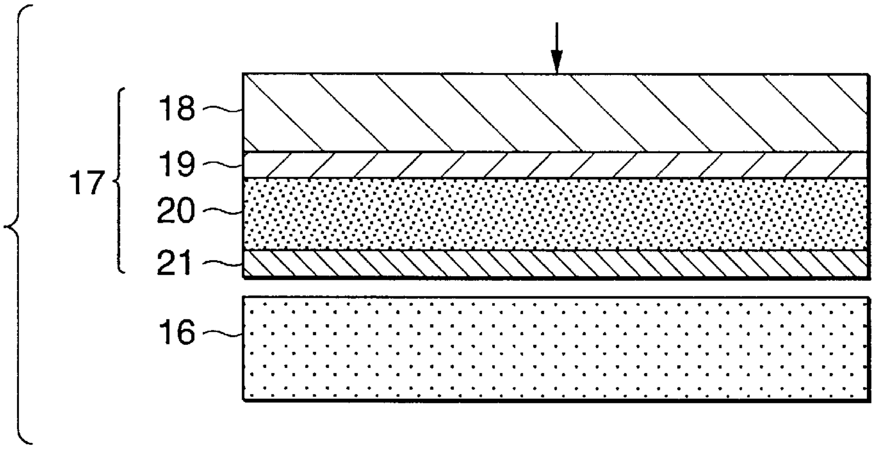
FIG. 10 is a structual diagram of a photo-heat-sensitive transfer material used for a single-color recording.

FIG. 10 is a structural drawing of a photo-thermo-sensitive transfer material 17. The photo-thermo-sensitive transfer material 17 comprises a substrate 18, a peel-off layer 19, a photo-thermo-sensitive transfer layer 20 and adherent layer 21.

Figure 11:
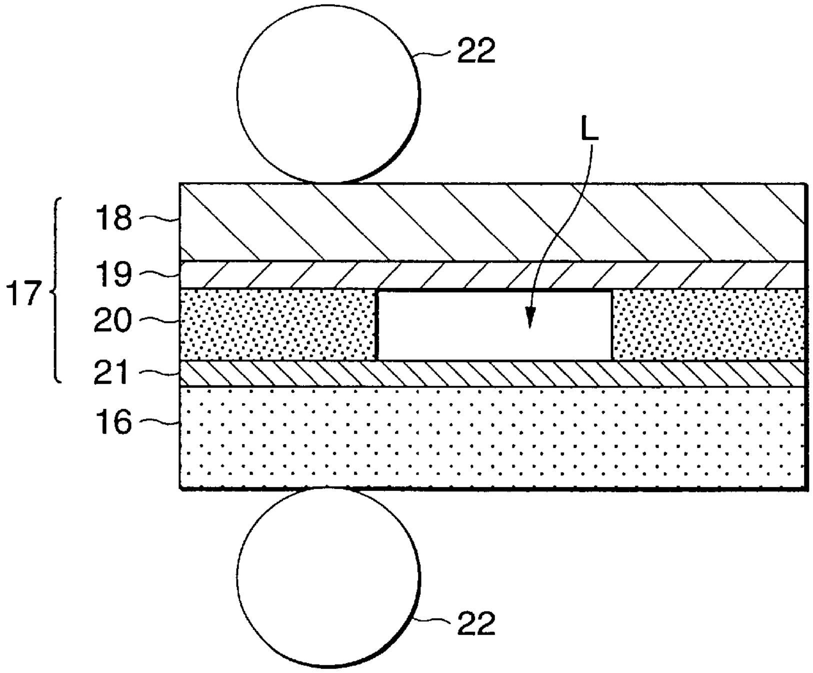
FIG. 11 shows a heat development process using the transfer material shown in FIG. 10.
Figure 12:
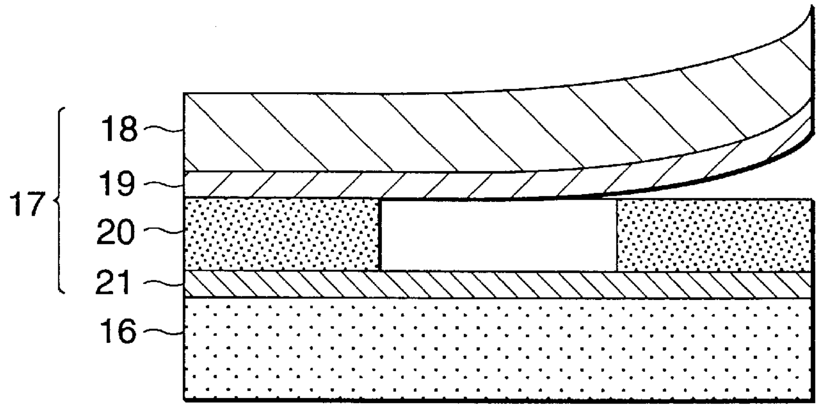
FIG. 12 shows a process peeling a photo-heat-sensitive transfer layer of the transfer material shown in FIG. 10.

A recording process using this type of material is as follows:

a) Image receiving paper 16 is put on a recording drum or a recording board;

b) The photo-thermo-sensitive transfer material 17 is wound on the image receiving layer 16;

c) Laser recording is executed based on desired image or text data. Wavelength of laser light (indicated by an arrow) responsive to the color development component contained in the photo-thermo-sensitive transfer layer 20 is adopted. Then, a latent image (denoted by L in FIG. 11) is formed only in the portion to which laser light is applied;

d) Heat is applied with a heat roller for thermal developing as shown in FIG. 11. However, the heater need not be a heat roller. At this time, a cover sheet or a metal sheet may be placed between the heat roller and the photo-thermo-sensitive transfer layer or the image receiving paper. Then, color is removed only in the portion to which laser light is applied, and the portion to which not laser light is applied is fixed. After this, light reactivity is lost;

e) The photo-thermo-sensitive transfer material 20 is peeled as shown in FIG. 12. At this time, only the substrate 18 and the peel-off layer 19 are peeled and only the photo-thermo-sensitive transfer layer 20 is left on the image receiving paper 16 with help of the adherent layer 21; and f) Image is fixed by light application of a lamp, or the like.

B) Single-color Type for Multicolor Recording with Four-wavelength Laser Light

Figure 13:
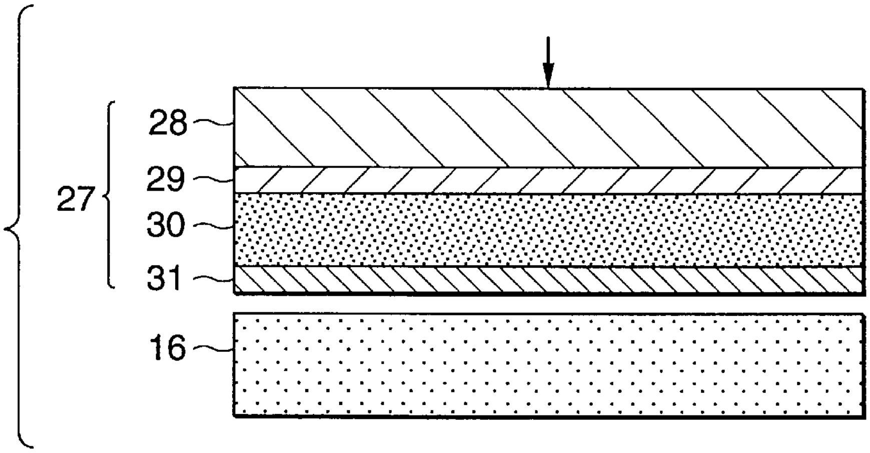
FIG. 13 is a structual diagram of a photo-heat-sensitive transfer material for black used for a multicolor recording.

FIG. 13 is a structural drawing of a photo-thermo-sensitive transfer material 27. The photo-thermo-sensitive transfer material 27 comprises a substrate 28, a peel-off layer 29, a photo-thermo-sensitive transfer layer (for black) 30 and an adherent layer 31.

Figure 14:
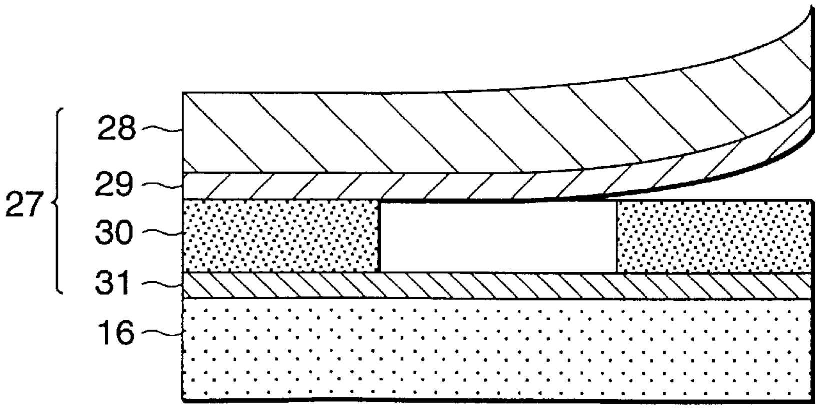
FIG. 14 shows a process of peeling a photo-heat-sensitive transfer layer of the transfer material shown in FIG. 13.
Figure 15:
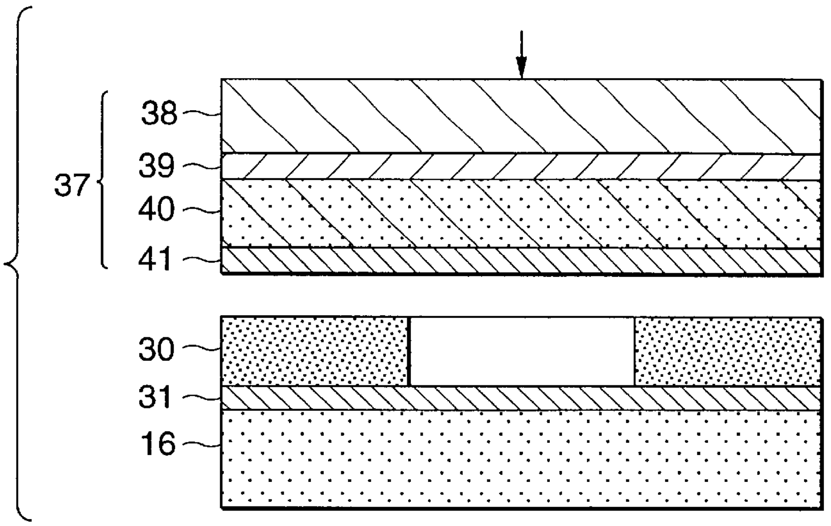
FIG. 15 is a structual diagram of a photo-heat-sensitive transfer material for cyan used for a multicolor recording.
Figure 16:
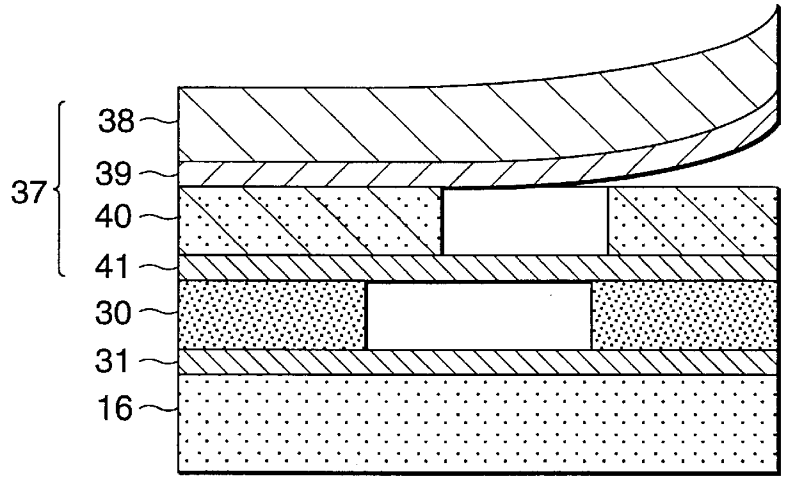
FIG. 16 shows a process of peeling a photo-heat-sensitive transfer layer of the transfer material shown in FIG. 15.
Figure 17:
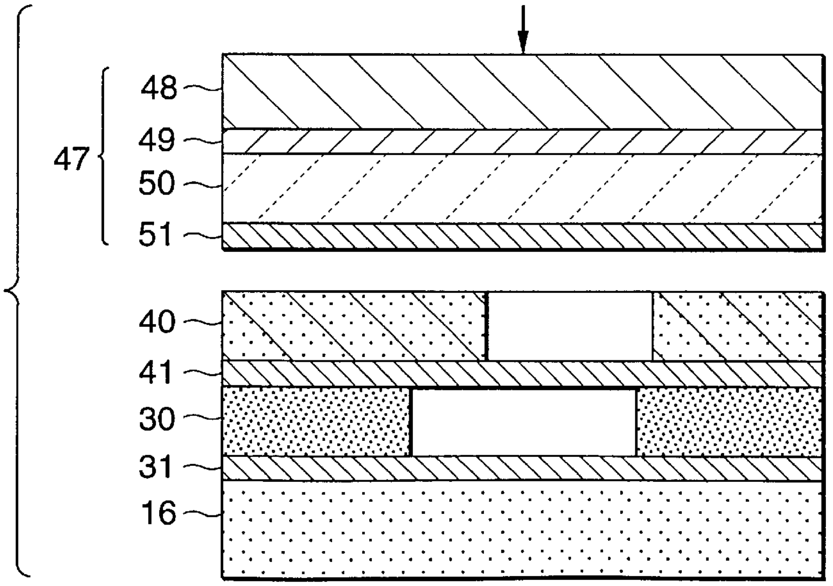
FIG. 17 is a structual diagram of a photo-heat-sensitive transfer material for magenta used for a multicolor recording.
Figure 18:
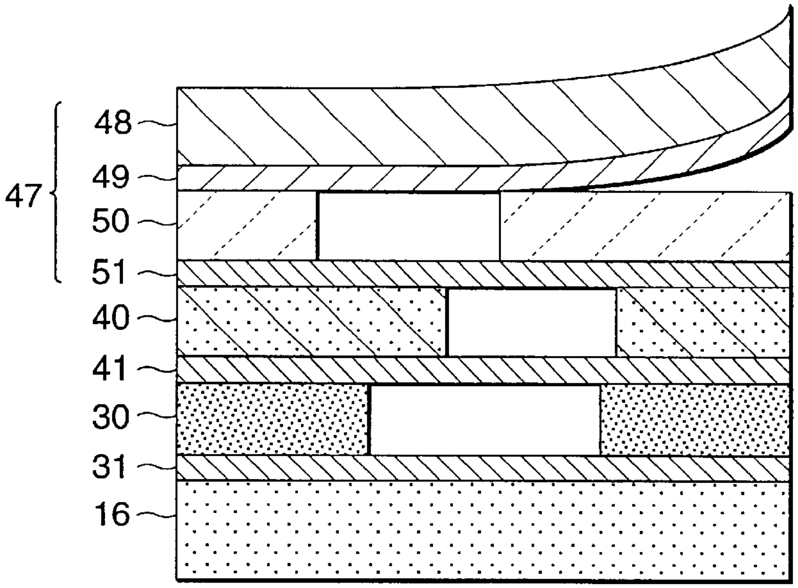
FIG. 18 shows a process of peeling a photo-heat-sensitive transfer layer of the transfer material shown in FIG. 17.
Figure 19:
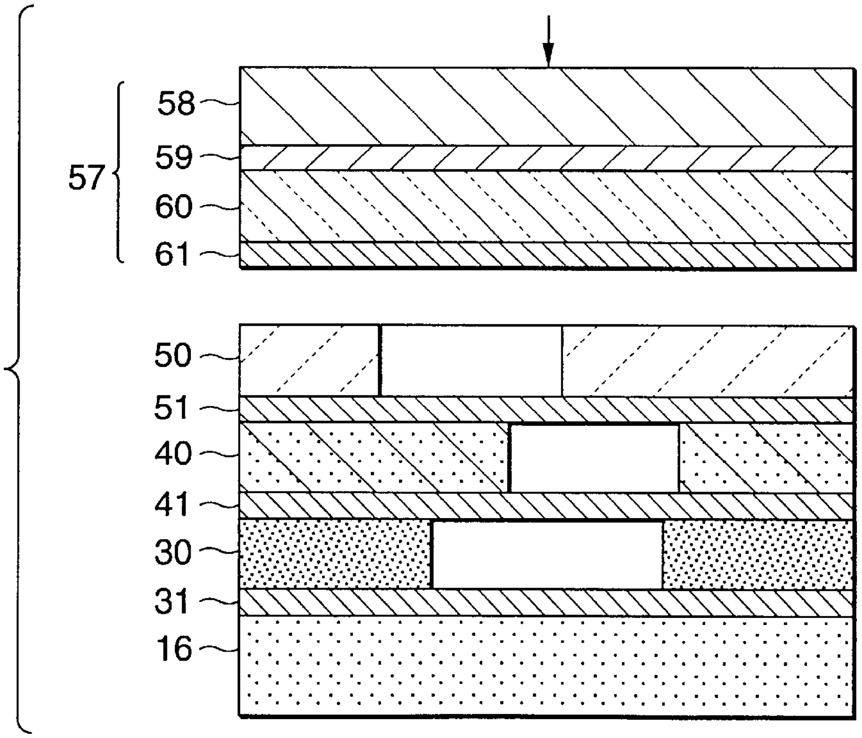
FIG. 19 is a structual diagram of a photo-heat-sensitive transfer material for yellow used for a multicolor recording.
Figure 20:
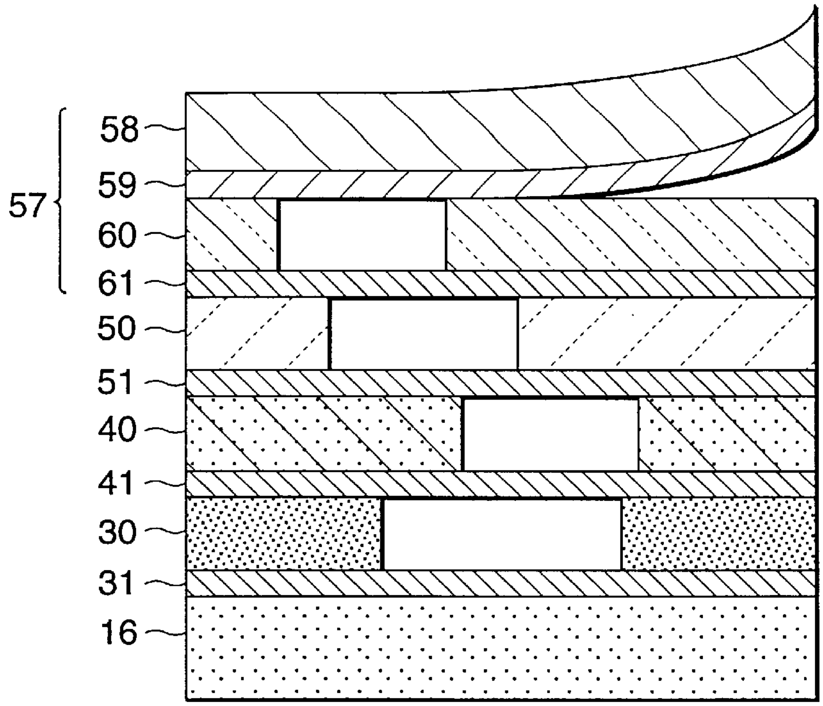
FIG. 20 shows a process of peeling a photo-heat-sensitive transfer layer of the transfer material shown in FIG. 19.
Figure 21:
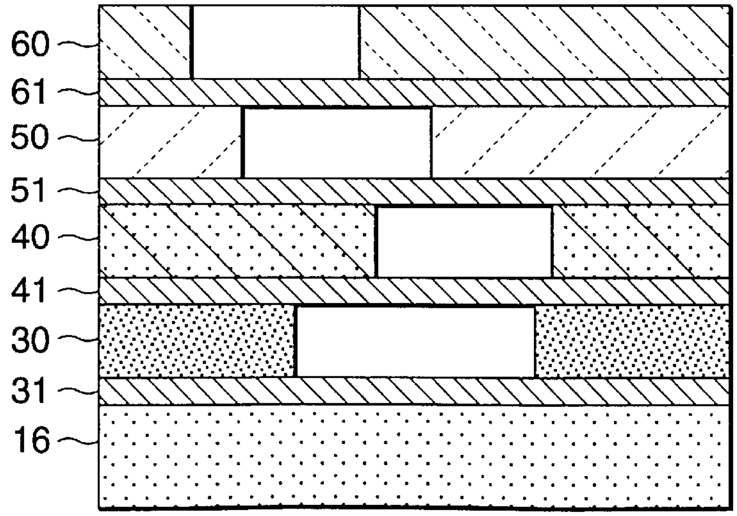
FIG. 21 is a structual diagram of a finally obtained four-colored image on an image receiving paper.

A recording process using this type of material is as follows:

a) Image receiving paper 16 is put on a recording drum or a recording board;

b) The photo-thermo-sensitive transfer material 27 is wound on the image receiving layer 16;

c) Laser light (indicated by an arrow) of wavelength responsive to the color development component contained in the photo-thermo-sensitive transfer layer 30 (any wavelength in the range of 300 to 1100 nm) is used for recording. For example, here, laser recording of wavelength approximately 830 nm is executed based on K data. Then, a latent image is formed only in the portion to which laser light is applied;

d) Heat is applied with a heat roller for thermal developing. Then, color is removed only in the portion to which laser light is applied, and the portion to which not laser light is applied is fixed. After this, light reactivity is lost;

e) The photo-thermo-sensitive transfer layer 30 is peeled as shown in FIG. 14. At this time, only the substrate 28 and the peel-off layer 29 are peeled and only the photo-thermo-sensitive transfer layer 30 is left on the image receiving paper 16 with help of the adherent layer 31; and f) A photo-thermo-sensitive transfer material 37 is wound on the photo-thermo-sensitive transfer layer 30 as shown in FIG. 15. The photo-thermo-sensitive transfer material 37 comprises a substrate 38, a peel-off layer 39, a photo-thermo-sensitive transfer layer (for cyan) 40 and an adherent layer 41;

g) Laser light (indicated by an arrow) of wavelength responsive to the color development component contained in the photo-thermo-sensitive transfer layer 40 (any wavelength in the range of 300 to 1100 nm) is used for recording. For example, laser recording of wavelength approximately 650 nm is executed based on C data. Then, a latent image is formed only in the portion to which laser light is applied;

h) Heat is applied for thermal developing. Then, color is removed only in the portion to which laser light is applied, and the portion to which not laser light is applied is fixed. After this, light reactivity is lost;

i) The photo-thermo-sensitive transfer layer 40 is peeled as shown in FIG. 16. At this time, the substrate 38 and the peel-off layer 39 are peeled and the photo-thermo-sensitive transfer layer 40 is left on the image receiving paper 16 with help of the adherent layer 41.

j) A photo-thermo-sensitive transfer material 47 is wound on the photo-thermo-sensitive transfer layer 40 as shown in FIG. 17. The photo-thermo-sensitive transfer material 47 comprises a substrate 48, a peel-off layer 49, a photo-thermo-sensitive transfer layer (for magenta) 50 and an adherent layer 51;

k) Laser light (indicated by an arrow) of wavelength responsive to the color development component contained in the photo-thermo-sensitive transfer layer 50 (any wavelength in the range of 300 to 1100 nm) is used for recording. For example, laser recording of wavelength approximately 530 nm is executed based on M data. Then, a latent image is formed only in the portion to which laser light is applied;

l) Heat is applied for thermal developing. Then, color is removed only in the portion to which laser light is applied, and the portion to which not laser light is applied is fixed. After this, light reactivity is lost;

m) The photo-thermo-sensitive transfer layer 50 is peeled as shown in FIG. 18. At this time, the substrate 48 and the peel-off layer 49 are peeled and the photo-thermo-sensitive transfer layer 50 is left on the image receiving paper 16 with help of the adherent layer 51;

n) A photo-thermo-sensitive transfer material 57 is wound on the photo-thermo-sensitive transfer layer 50 as shown in FIG. 19. The photo-thermo-sensitive transfer material 57 comprises a substrate 58, a peel-off layer 59, a photo-thermo-sensitive transfer layer (for yellow) 60 and an adherent layer 61;

o) Laser light (indicated by an arrow) of wavelength responsive to the color development component contained in the photo-thermo-sensitive transfer layer 60 (any wavelength in the range of 300 to 1100 nm) is used for recording. For example, laser recording of wavelength approximately 400 nm is executed based on Y data. Then, a latent image is formed only in the portion to which laser light is applied;

p) Heat is applied for thermal developing. Then, color is removed only in the portion to which laser light is applied, and the portion to which not laser light is applied is fixed. After this, light reactivity is lost;

q) The photo-thermo-sensitive transfer layer 60 is peeled as shown in FIG. 20. At this time, the substrate 58 and the peel-off layer 59 are peeled and the photo-thermo-sensitive transfer layer 60 is left on the image receiving paper 16 with help of the adherent layer 61; and r) Image is fixed by light application of a lamp, etc., and the transparent portion is made more transparent. Finally, the four-color record of K, M, C, and Y as shown in FIG. 21 is provided on the image receiving paper 16.

C) Single-color Type for Multicolor Recording with One-wavelength Laser Light

FIG. 13 is a structural drawing of a photo-thermo-sensitive transfer material 27. The photo-thermo-sensitive transfer material 27 comprises a substrate 28, a peel-off layer 29, a photo-thermo-sensitive transfer layer (for black) 30 and an adherent layer 31.

A recording process using this type of material is as follows:

a) Image receiving paper 16 is put on a recording drum or a recording board;

b) The photo-thermo-sensitive transfer material 27 is wound on the image receiving layer 16;

c) Laser light (indicated by an arrow) of wavelength responsive to the color development component contained in the photo-thermo-sensitive transfer layer 30 (any wavelength in the range of 300 to 1100 nm) is used for recording. For example, here, laser recording of wavelength approximately 830 nm is executed based on K data. Then, a latent image is formed only in the portion to which laser light is applied;

d) Heat is applied with a heat roller for thermal developing. Then, color is removed only in the portion to which laser light is applied, and the portion to which not laser light is applied is fixed. After this, light reactivity is lost;

e) The photo-thermo-sensitive transfer layer 30 is peeled as shown in FIG. 14. At this time, only the substrate 28 and the peel-off layer 29 are peeled and only the photo-thermo-sensitive transfer layer 30 is left on the image receiving paper 16 with help of the adherent layer 31; and f) A photo-thermo-sensitive transfer material 37 is wound on the photo-thermo-sensitive transfer layer 30 as shown in FIG. 15. The photo-thermo-sensitive transfer material 37 comprises a substrate 38, a peel-off layer 39, a photo-thermo-sensitive transfer layer (for cyan) 40 and an adherent layer 41;

g) Laser light (indicated by an arrow) of wavelength responsive to the color development component contained in the photo-thermo-sensitive transfer layer 40 (any wavelength in the range of 300 to 1100 nm) is used for recording. For example, laser recording of wavelength approximately 830 nm is executed based on C data. Then, a latent image is formed only in the portion to which laser light is applied;

h) Heat is applied for thermal developing. Then, color is removed only in the portion to which laser light is applied, and the portion to which not laser light is applied is fixed. After this, light reactivity is lost;

i) The photo-thermo-sensitive transfer layer 40 is peeled as shown in FIG. 16. At this time, the substrate 38 and the peel-off layer 39 are peeled and the photo-thermo-sensitive transfer layer 40 is left on the image receiving paper 16 with help of the adherent layer 41.

j) A photo-thermo-sensitive transfer material 47 is wound on the photo-thermo-sensitive transfer layer 40 as shown in FIG. 17. The photo-thermo-sensitive transfer material 47 comprises a substrate 48, a peel-off layer 49, a photo-thermo-sensitive transfer layer (for magenta) 50 and an adherent layer 51;

k) Laser light (indicated by an arrow) of wavelength responsive to the color development component contained in the photo-thermo-sensitive transfer layer 50 (any wavelength in the range of 300 to 1100 nm) is used for recording. For example, laser recording of wavelength approximately 830 nm is executed based on M data. Then, a latent image is formed only in the portion to which laser light is applied;

l) Heat is applied for thermal developing. Then, color is removed only in the portion to which laser light is applied, and the portion to which not laser light is applied is fixed. After this, light reactivity is lost;

m) The photo-thermo-sensitive transfer material 50 is peeled as shown in FIG. 18. At this time, the substrate 48 and the peel-off layer 49 are peeled and the photo-thermo-sensitive transfer layer 50 is left on the image receiving paper 16 with help of the adherent layer 51;

n) A photo-thermo-sensitive transfer material 57 is wound on the photo-thermo-sensitive transfer layer 50 as shown in FIG. 19. The photo-thermo-sensitive transfer material 57 comprises a substrate 58, a peel-off layer 59, a photo-thermo-sensitive transfer layer (for yellow) 60 and an adherent layer 61;

o) Laser light (indicated by an arrow) of wavelength responsive to the color development component contained in the photo-thermo-sensitive transfer layer 60 (any wavelength in the range of 300 to 1100 nm) is used for recording. For example, laser recording of wavelength approximately 830 nm is executed based on Y data. Then, a latent image is formed only in the portion to which laser light is applied;

p) Heat is applied for thermal developing. Then, color is removed only in the portion to which laser light is applied, and the portion to which not laser light is applied is fixed. After this, light reactivity is lost;

q) The photo-thermo-sensitive transfer layer 60 is peeled as shown in FIG. 20. At this time, the substrate 58 and the peel-off layer 59 are peeled and the photo-thermo-sensitive transfer layer 60 is left on the image receiving paper 16 with help of the adherent layer 61; and r) Image is fixed by light application of a lamp, etc. In this step, the transparent portion is made more transparent (so-called transparent area fixing). Finally, the four-color record of K, M, C, and Y as shown in FIG. 21 is provided on the image receiving paper 16. The transparent area fixing step may be executed after the color development step or the image fixing step in the recording process of each color although the total recording time is prolonged.

D) Multicolor type (Multilayer Photo-thermo-sensitive Transfer Material Type)

Figure 22:
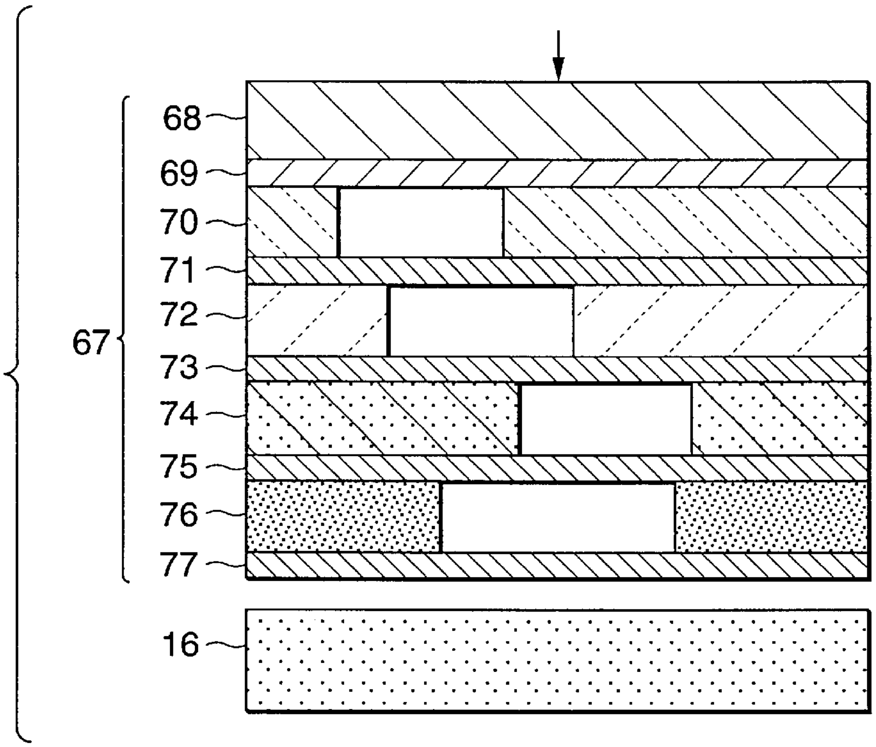
FIG. 22 is a structual diagram of a multi-layer photo-heat-sensitive transfer material.

FIG. 22 is a structural diagram of this type of a photo-thermo-sensitive transfer material 67. That is, color layers are K, C, M, and Y in order from the image receiving layer side, an adhesive layer is provided below each color layer, and a peel-off layer 69 to easily peel a substrate 68 is provided on the color layer side of the substrate 68.

The color layers are K, C, M, and Y in order from the base paper side; any other color layer order may be adopted, of course.

The number of the color layers is not limited to four; two color layers (M and C) or three color layers (M, C, and Y with K as mixed color of M, C, and Y) can also be used. Further, more than four color layers (gray, green, orange, gold, silver, etc., as special color) can also be used.

The recording process is as follows:

a) The image receiving paper 16 is put on a recording drum or a recording board;

b) The photo-thermo-sensitive transfer material 67 is wound on the image receiving layer 16 as shown in FIG. 22;

c) Laser light (indicated by an arrow) of wavelength corresponded to the absorption wavelength of the photo-thermo-sensitive transfer layer of each color (any wavelength in the range of 300 to 1100 nm) is used for recording separately for each color. For example, (1) laser recording of wavelength approximately 830 nm is executed based on to K data;

(2) laser recording of wavelength approximately 650 nm is executed based on to C data;

(3) laser recording of wavelength approximately 530 nm is executed based on to M data; and (4) laser recording of wavelength approximately 400 nm is executed based on to Y data. Of course, the wavelengths are not limited to them.

The above-mentioned laser light is used for exposing in the four colors of K, C, M, and Y at the same time, whereby the recording time can be reduced to a quarter.

If exposing is executed in the order of K, C, M, and Y, the recording time is shortened as much as the substrate peeling time.

Then, a latent image is formed only in the portion to which laser light is applied;

d) Heat is applied for thermal developing;

e) The photo-thermo-sensitive transfer layer for yellow 70 is peeled, as shown in FIG. 20. At this time, only the substrate 68 and the peel-off layer 69 are peeled and the photo-thermo-sensitive transfer layers are left on the image receiving paper 16 with help of the adherent layer 77; and f) Image is fixed by light application of a lamp, etc. In this step, the transparent portion is made more transparent (so-called transparent area fixing). Finally, the four-color record of K, M, C, and Y as shown in FIG. 21 is provided on the image receiving paper or base paper.

As set forth above, according to the present invention, the recording sensitivity can be increased by making the polarizing directions of the substrate and the recording laser light coincident with each other and transmitting laser power up to the photothermal conversion layer as much as possible so as to convert the light energy into thermal energy therein.

Furthermore, the light and heat energy can be effectively utilized as the quantity of reflected light can be reduced.

Since the lot-to-lot difference of the recording medium varying with the PET base of the substrate, sensitivity difference due to difference in color between toner sheets for use and the difference of slit portion from the raw fabric of the substrate can be compensated for, recording with recording sensitivity of constant quality can effectively be carried out at all times, irrespective of the recording material.

A recording laser beam can penetrate the substrate and reaches the active layer (photothermal conversion layer, photosensitive layer, photo-thermo-sensitive transfer layer), then the polarizing directions of the substrate of the photo-thermo-sensitive transfer material and the recording laser beam are made coincident with each other, whereby 1) high-sensitivity recording can be executed;

2) even recording can be executed; and 3) reflected light to the light source side is lessened since the penetration light amount is increased.

Thus, 4) power of the light source becomes stable;

5) a wavelength shift of the light source becomes hard to occur; and 6) the light source is hard to receive damage from reflected light and the probability of failure is decreased.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. An image recording apparatus for recording an image on a recording medium, which comprises a transparent substrate having dependence on polarization, which varies a transparency thereof within a range of ±10%, and a photosensitive layer provided on the substrate, by providing light energy of polarized light transmitted through the substrate into the photosensitive layer, comprising:

a laser light source emitting laser light as polarized light, wherein an angle made by the polarizing direction of the laser light and the polarizing direction of the substrate is ±30 degrees or smaller, and wherein the substrate forms an outermost surface of the recording medium.

2. The image recording apparatus as set forth in claim 1, wherein an optical axis of the incident laser light is tilted with respect to a normal of the substrate.

3. The image recording apparatus as set forth in claim 2, wherein the tilted angle between the normal of the substrate and the optical axis of the laser light is proximate to the Brewster's angle of the substrate.

4. The image recording apparatus as set forth in claim 2, wherein the tilted angle between the normal of the substrate and the optical axis of the laser light is in the range of 1–65 degrees.

5. The image recording apparatus as set forth in claim 1, wherein the recording medium is a photo-heat-sensitive transfer material including a transparent substrate and a photo-heat sensitive transfer layer.

6. An image recording apparatus for recording an image on a recording medium, which comprises a transparent substrate having dependence on polarization, which varies a transparency thereof within a range of ±10%, and a photosensitive layer provided on the substrate, by providing light energy of polarized light transmitted through the substrate into the photosensitive layer, comprising:

a rotary drum on which the recording medium is mounted; and a laser head emitting laser light as polarized light, wherein an angle made by the polarizing direction of the laser light and the polarizing direction of the substrate is ±30 degrees or smaller, and wherein the substrate forms an outermost surface of the recording medium.

7. The image recording apparatus as set forth in claim 6, wherein an optical axis of the incident laser light is tilted with respect to a normal of the substrate.

8. The image recording apparatus as set forth in claim 6, wherein the recording medium is a toner sheet roll, in which the polarizing direction of the substrate is coincident with an axial direction thereof, to be disposed into the image recording apparatus, and wherein the polarizing direction of the laser head is oriented to an axial direction of the rotary drum.

9. The image recording apparatus as set forth in claim 6, wherein the recording medium is a toner sheet roll, in which the polarizing direction of the substrate is coincident with a circumferencial direction thereof, to be disposed into the image recording apparatus, and wherein the polarizing direction of the laser head is oriented to a rotational direction of the rotary drum.

10. The image recording apparatus as set forth in claim 6, wherein the laser head is configured so as to be rotatable around an optical axis of the laser light emitted therefrom.

11. The image recording apparatus as set forth in claim 6, further comprising a phase plate rotatably provided at one of an emission side and inside of the laser head.

12. The image recording apparatus as set forth in claim 6, wherein information for indicating the polarizing direction of the substrate is recorded on at least one of the recording medium and a package of the recording medium.

13. The image recording apparatus as set forth in claim 12, wherein the indicating information is constituted by at least one of a numerical value, a symbol, a bar code, a magnetic recording medium and an IC card.

14. The image recording apparatus as set forth in claim 12, further comprising:

a reading device for reading the indicating information; and a driving device for rotating the laser head around an optical axis of the laser light emitted therefrom so as to make the polarizing direction of the laser light coincident with the polarizing direction read from the indicating information by the reading device.

15. The image recording apparatus as set forth in claim 12, further comprising:

a reading device for reading the indicating information;

a phase plate rotatably provided at one of an emission side and inside of the laser head; and a driving device for rotating the phase plate so as to make the polarizing direction thereof coincident with the polarizing direction read from the indicating information by the reading device.

16. The image recording apparatus as set forth in claim 6, wherein the recording medium is a photo-heat-sensitive transfer material including a transparent substrate and a photo-heat sensitive transfer layer.

* * * * *